US008924056B2

United States Patent
Chorian et al.

(10) Patent No.: US 8,924,056 B2
(45) Date of Patent: Dec. 30, 2014

(54) SYSTEM AND METHOD FOR BALANCING A STORAGE BATTERY FOR AN AUTOMOTIVE VEHICLE

(75) Inventors: Steven F. Chorian, Canton, MI (US); Jin Wang, Powell, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 1317 days.

(21) Appl. No.: 12/574,888

(22) Filed: Oct. 7, 2009

(65) Prior Publication Data
US 2011/0082607 A1    Apr. 7, 2011

(51) Int. Cl.
G06F 19/00    (2011.01)
H02J 7/00    (2006.01)
B60K 6/445    (2007.10)
B60L 11/18    (2006.01)
H01M 10/44    (2006.01)
H01M 10/46    (2006.01)
H01M 10/0525    (2010.01)

(52) U.S. Cl.
CPC ............... *H02J 7/0019* (2013.01); *B60K 6/445* (2013.01); *B60L 11/1864* (2013.01); *H01M 10/441* (2013.01); *H01M 10/46* (2013.01); *H01M 10/0525* (2013.01); *Y02T 10/6239* (2013.01); *Y02T 10/7005* (2013.01); *Y02T 10/7011* (2013.01); *Y02T 10/7055* (2013.01); *Y02T 10/7061* (2013.01)
USPC ............. 701/22; 320/118; 320/116; 320/119; 180/65.21; 180/65.29; 340/636.1; 340/636.17; 340/636.2

(58) Field of Classification Search
CPC ............ Y02T 10/7005; Y02T 10/7055; Y02T 10/7061; Y02T 10/7044; B60L 11/1851; B60L 11/1861; B60L 11/1864; B60L 11/12; B60L 11/18; B60L 11/1866; B60L 11/187; B60L 11/1872; B60L 11/1875; H01M 10/42; H01M 10/50; H01M 10/04
USPC ............ 701/22; 320/118, 116, 119, 134, 104, 320/112, 120, 132, 136, 149, 150, 154; 180/65.21, 65.29, 65.8; 340/636.1, 340/636.12, 636.15, 636.17, 636.2, 636.21
See application file for complete search history.

(56) References Cited

U.S. PATENT DOCUMENTS

| | | | |
|---|---|---|---|
| 5,969,624 A * | 10/1999 | Sakai et al. ................. | 340/636.1 |
| 5,982,153 A | 11/1999 | Nagai et al. | |
| 6,605,773 B2 * | 8/2003 | Kok et al. ..................... | 136/242 |
| 7,213,665 B2 | 5/2007 | Yamaguchi et al. | |
| 7,253,353 B2 * | 8/2007 | Stabler .......................... | 136/205 |
| 7,400,113 B2 * | 7/2008 | Osborne ....................... | 320/118 |

(Continued)

FOREIGN PATENT DOCUMENTS

CN    1481059 A    3/2004

*Primary Examiner* — Adam Tissot
(74) *Attorney, Agent, or Firm* — David B. Kelley; Brooks Kushman P.C.

(57) ABSTRACT

A system and method is provided for balancing a storage battery for an automotive vehicle. The battery is of the type including a plurality of storage cells. The system includes a thermoelectric device and a controller. The thermoelectric device receives thermal energy and converts the thermal energy into electric energy. The controller determines a subset of the storage cells in the battery to be charged based on an amount of electric charge in each of the storage cells. Furthermore, the controller causes the electric energy to be distributed to each storage cell in the subset in an effort to balance the battery in the vehicle.

18 Claims, 3 Drawing Sheets

(56) References Cited

U.S. PATENT DOCUMENTS

| | | | |
|---|---|---|---|
| 7,426,910 B2* | 9/2008 | Elwart | 123/46 E |
| 7,859,227 B2* | 12/2010 | Saigo | 320/136 |
| 8,035,349 B2* | 10/2011 | Lubawy | 320/150 |
| 2005/0271916 A1 | 12/2005 | Yang et al. | |
| 2006/0066106 A1 | 3/2006 | Yang et al. | |
| 2006/0216559 A1 | 9/2006 | Olivier et al. | |
| 2007/0029971 A1 | 2/2007 | Anderson et al. | |
| 2007/0080664 A1 | 4/2007 | Maguire et al. | |
| 2010/0117593 A1* | 5/2010 | Piccard et al. | 320/104 |
| 2010/0243346 A1* | 9/2010 | Anderson et al. | 180/65.21 |

* cited by examiner

SYSTEM AND METHOD FOR BALANCING A STORAGE BATTERY FOR AN AUTOMOTIVE VEHICLE

BACKGROUND

1. Technical Field

System and method for balancing a storage battery for an automotive vehicle.

2. Background Art

An electric vehicle (EV), a hybrid electric vehicle (HEV), and a fuel cell vehicle (FCV) generally include a high-voltage storage battery. In operation, the storage battery provides electric power to operate various components in the vehicle, such as an electric motor for driving vehicle traction wheels. The storage battery generally includes a plurality of electrochemical cells that can store electric charge. Each of these cells has a state of charge (SOC). However, some of the cells in the storage battery may have a greater SOC than other cells in the storage battery. When this occurs, the storage battery is said to be unbalanced. When the storage battery becomes unbalanced, it may be desirable or necessary to balance or rebalance the storage battery.

SUMMARY

A system and method is provided for balancing an electrical storage battery, of the type including a plurality of storage cells, for an automotive vehicle. The system includes a thermoelectric device and a controller.

The thermoelectric device is adapted to receive thermal energy and to convert the thermal energy into electric energy. The thermoelectric device may be adapted to receive thermal energy from the battery, an engine in the vehicle, a transaxle in the vehicle, or a combination thereof. In addition, the thermoelectric device may be adapted to receive electric energy from the battery and to convert the electric energy to thermal energy to heat at least a portion of the battery.

The controller is configured to determine a subset of the cells in the battery to be charged. The subset does not include all of the cells. The subset is determined based on an amount of electric charge in each of the cells. For example, the controller may determine the subset based on which of the cells has an electric charge below a predetermined amount of electric charge. The controller may receive one or more electric signals indicating the amount of electric charge in each of the cells and process the signals to determine the subset.

The controller is configured to cause electric energy to be distributed to each cell in the subset in an effort to balance the battery in the vehicle. The system may include an array of switches. The controller may control the array of switches to distribute the electric energy from the thermoelectric device to each cell in the subset.

In at least one embodiment, the controller causes the electric energy to be distributed to each cell in the subset based on the amount of electric charge in each cell in the subset. For example, the controller may cause the electric energy to be distributed to a cell having a low electric charge before the controller distributes electric energy to a cell having a greater electric charge. In another example, the controller may cause the electric energy to be distributed from the battery to the thermoelectric device when at least one of the cells in the battery has an amount of electric charge exceeding a predetermined amount of electric charge.

In at least one embodiment, the controller determines a desired state of charge for at least one of the cells and causes the electric energy to be distributed from the thermoelectric device to the one cell until the desired state of charge for that one cell is achieved. The one cell may reach the desired state of charge before the controller causes the electric energy to be distributed to another cell in the battery.

In at least one embodiment, the controller determines a state of balance of the battery based on the amount of electric charge in each of the cells and causes the electric energy to be distributed from the thermoelectric device to the cells based on the state of balance. The controller may cause the electric energy to be distributed to the battery when the state of balance indicates that the cells in the battery are unequally charged.

The controller may determine a difference of electric charge between at least two of the cells in the battery. Furthermore, the controller may cause the electric energy to be distributed from the thermoelectric device to the cells in the battery based on the difference of electric charge.

Distributing the electric energy to each cell in the subset substantially equalizes the amount of electric charge in the cells. The controller may cause the electric energy to be distributed to each cell in the subset after a drive cycle of the vehicle. In addition, the controller may cause the electric energy to be distributed in a generally uniform manner to each of the cells in the battery when the battery is substantially equalized.

The method includes converting thermal energy into electric energy, determining a subset of the cells in the battery to receive the electric energy, and distributing the electric energy to each cell in the subset in an effort to balance the battery in the vehicle. The subset is determined based on an amount of electric charge in each of the cells. The thermal energy may be received from the battery, the engine, the transaxle, or a combination thereof.

DETAILED DESCRIPTION

Embodiments of the present invention generally provide a system and method for balancing a storage battery for an automotive vehicle. The system and its method of operation are described in an integrated manner to facilitate an understanding of various aspects of the present invention.

Figure 1:
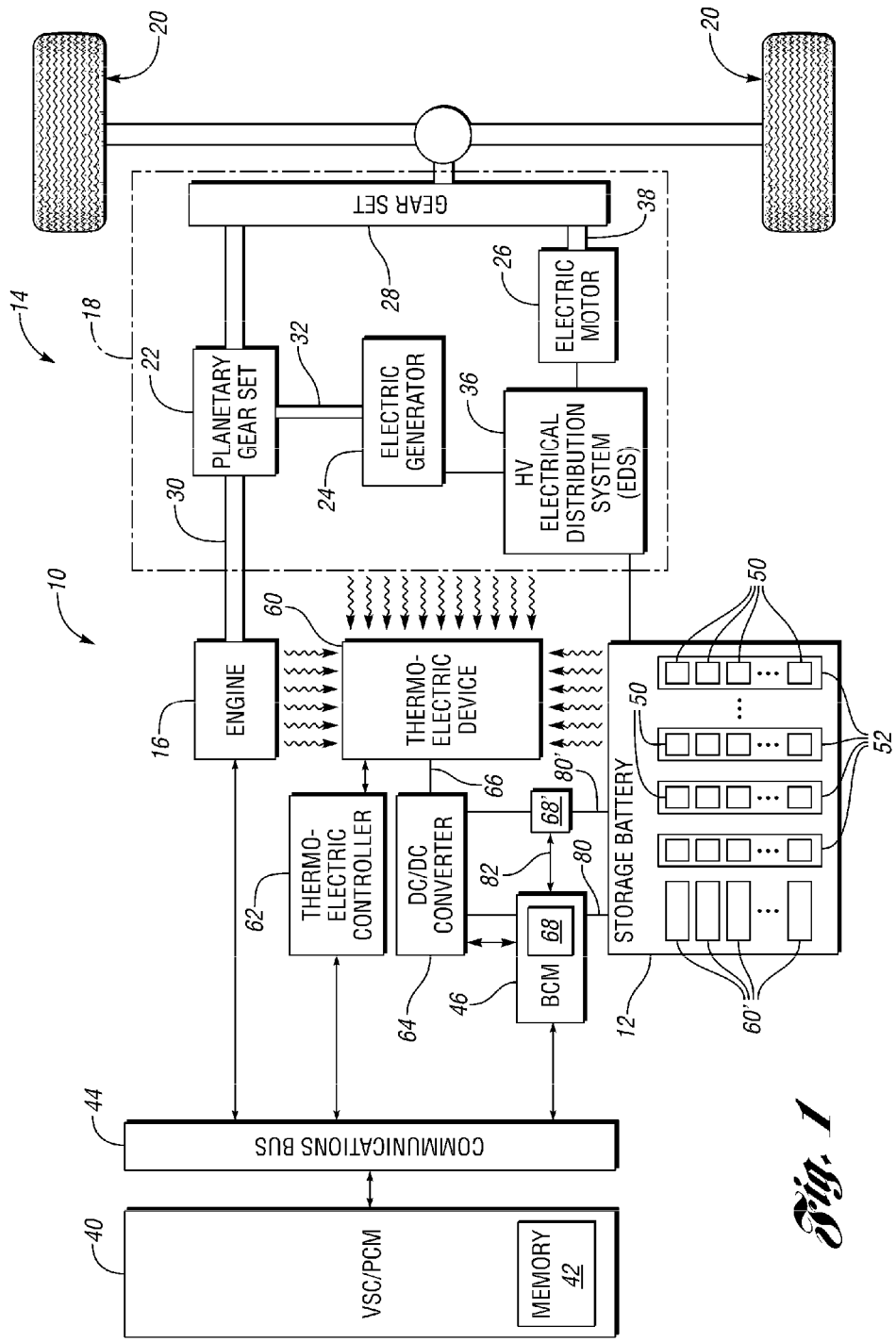
FIG. 1 is a schematic diagram illustrating an automotive vehicle having a storage battery and a system for balancing the storage battery.

With reference to FIG. 1, a system 10 is generally provided for balancing an electrical storage battery 12 (hereinafter "battery") for an automotive vehicle (hereafter "vehicle"). The system 10 of FIG. 1 is shown integrated with a powertrain of a parallel/series hybrid electric vehicle (PSHEV). However, the system 10 may be separate from the vehicle 14, external to the vehicle 14, or integrated with other types of automotive vehicles that are adapted to receive the battery 12, such as a series hybrid electric vehicle (SHEV), a parallel hybrid electric vehicle (PHEV), an electric vehicle (EV), a plug-in hybrid electric vehicle, fuel cell electric vehicle (FCEV), and a hybrid fuel cell electric vehicle.

As illustrated in FIG. 1, the vehicle 14 includes an engine 16, a transaxle 18, and drive wheels 20. The engine 16 and the battery 12 selectively provide power to the drive wheels 20 so that the vehicle 14 can be propelled. During operation, the battery 12, the engine 16, and the transaxle 18 heat or generate thermal energy, which the system 10 may convert into electric energy to balance the battery 12.

With continuing reference to FIG. 1, the transaxle 18 includes a planetary gear set 22, an electric generator 24, an electric motor 26, and a gear set 28. The transaxle 18 is coupled between the drive wheels 20 and the engine 16 and battery 12 to control how and when power is transferred to the drive wheels 20. The electric motor 26 and the electric generator 24 are two electric machines that make up an electric machine arrangement. Thus, the electric motor 26 and the electric generator 24 each represent a portion of the electric machine arrangement. However, the vehicle 14 may have different electric machine arrangements, such as more or less than two electric machines. The electric motor 26 and the electric generator 24 of FIG. 1 can both be used as motors to output torque. Alternatively, each can also be used as a generator that outputs electrical power.

As shown in FIG. 1, the planetary gear set 22 of the transaxle 18 mechanically connects the engine 16 and the electric generator 24. The planetary gear set 22 can have a ring gear, a carrier, planet gears, and a sun gear. Alternatively, the planetary gear set 22 may include other types of gear sets and transmissions for coupling the engine 16 to the electric generator 24.

As depicted in FIG. 1, the engine 16 outputs torque to shaft 30 connected to the planetary gear set 22. The planetary gear set 22 receives the power from the engine 16 through the shaft 30 and transfers the power either to the drive wheels 20 through gear set 28 or to the electric generator 24. In addition to receiving power from the engine 16, the planetary gear set 22 can also receive power from the electric generator 24.

As illustrated in FIG. 1, the electric generator 24 can be used as either an electric motor, a machine that converts mechanical energy into electrical energy, or both. Operating as an electric motor, the electric generator 24 outputs torque to shaft 32 connected to the planetary gear set 22, which can transfer the torque to the engine 16. Operating as a machine that converts mechanical energy into electrical energy, the electric generator 24 can output electric energy to a high-voltage electrical distribution system 36 (hereinafter "EDS"). The EDS 36 receives the electric energy from the electric generator 24 and distributes the electrical energy between the battery 12 and the electric motor 26, depending on the driving mode of the vehicle 14. The EDS 36 can also receive electric energy from the battery 12 and/or the electric motor 26 and distribute the electric energy to the battery 12, the electric motor 26, the electric generator 24, or a combination thereof.

As shown in FIG. 1, the electric motor 26 outputs torque to shaft 38 connected to the gear set 28. The gear set 28 receives power from the electric motor 26 through shaft 38 and transfers the power to the drive wheels 20 to propel the vehicle 14.

The generator 24 and the electric motor 26 can both be used as motors to output torque. Alternatively, each can also be used as a generator, outputting electrical power to the EDS 36 and to the battery 12. During any one of these operations, the electric motor 26, the generator 24, or both may generate thermal energy, which the system 10 can convert into electric energy to balance the battery 12.

With continuing reference to FIG. 1, the vehicle 14 includes a vehicle controller 40 or some other type of programmable logic device to control various components of the powertrain of the vehicle 14. The vehicle controller 40 of FIG. 1 is shown as a combination of a vehicle system controller (VSC) and a powertrain control module (PCM). The combination of the VSC and the PCM is hereinafter referenced as a "VSC/PCM" having reference numeral 40. Although the VSC/PCM 40 is shown as a single hardware device, the VSC/PCM 40 may include multiple controllers in the form of multiple hardware devices, or multiple software controllers within one or more hardware devices.

The system 10 includes a computer-readable storage medium 42 (hereinafter "memory") to store data or information about the various components in the vehicle 14 as well as various computer programs or algorithms to control the powertrain of the vehicle 14. The memory 42 can be part of the VSC/PCM 40 as shown in FIG. 1. However, the memory 42 may be positioned in any suitable portion of the vehicle 14 accessible to the VSC/PCM 40.

As shown in FIG. 1, the VSC/PCM 40 controls the transaxle 18, the engine 16, and the battery 12 through a communications bus 44. The communications bus 44 is in communication with various components of the vehicle 14 including one or more controllers of the transaxle 18, the engine 16, and the battery 12. The communications bus 44 may be implemented as a controller area network (CAN), a local interconnect network (LIN), or any such suitable data-communication link that can transfer data between the VSC/PCM 40 and other devices in the vehicle 14.

The VSC/PCM 40 can control the transaxle 18, the engine 16, and the battery 12 either directly or through separate controllers that control the transaxle 18, the engine 16, or the battery 12 under supervisory control of the VSC/PCM 40. For example, the VSC/PCM 40 may communicate with a battery control module (BCM) 46 to control the battery 12. The BCM 46 transmits and receives signals to and from the VSC/PCM 40.

Figure 2:
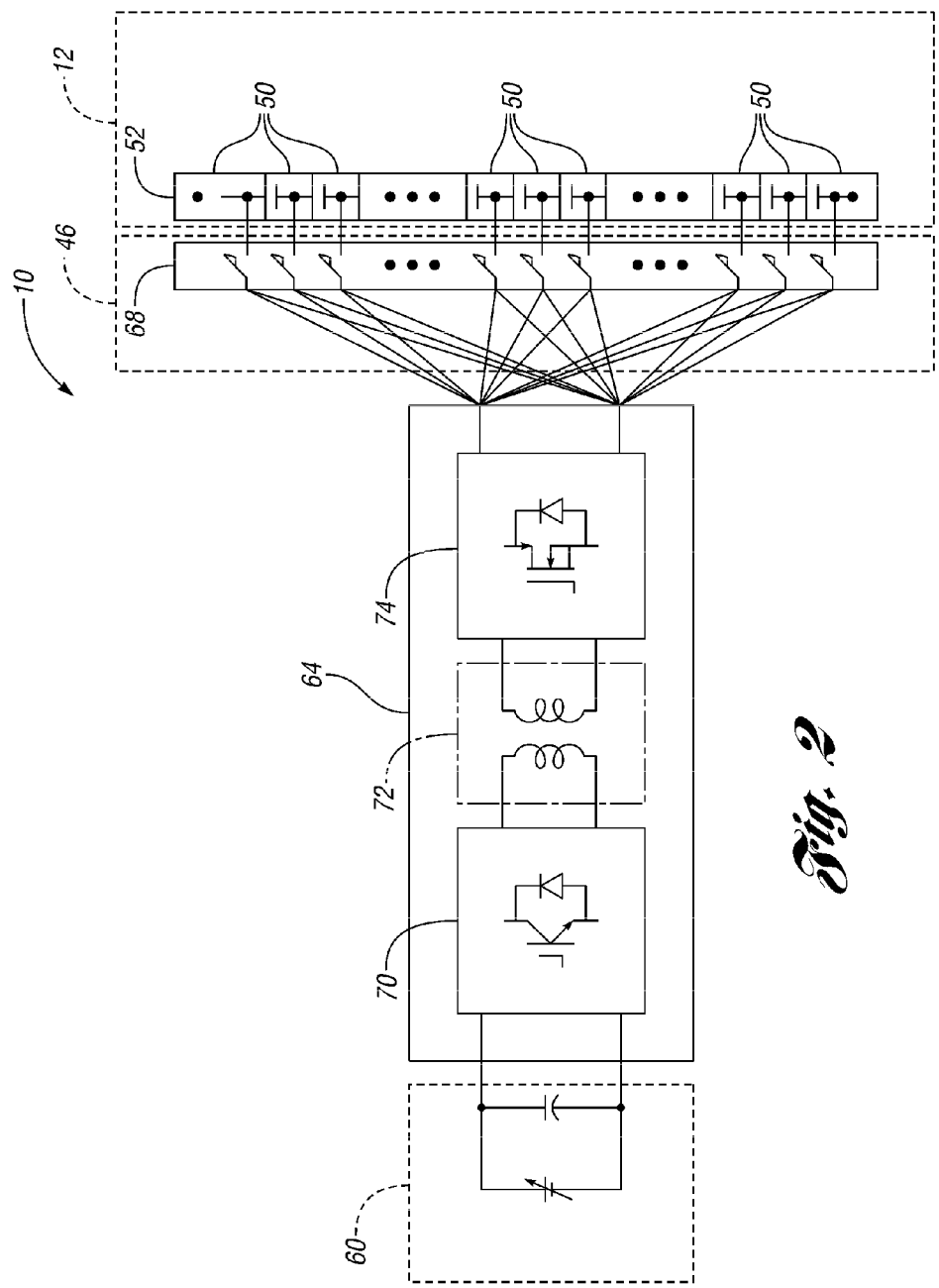
FIG. 2 is a schematic diagram illustrating the system including a thermoelectric device, a DC/DC converter, and a controller for balancing the storage battery.

As illustrated in FIGS. 1-2, the battery 12 includes a plurality of storage cells 50. The battery 12 of FIG. 1 is shown as a high-voltage battery that is capable of outputting electric power to operate the electric motor 26 and the generator 24. For example, the battery 12 may be a lithium ion battery that has a plurality of lithium ion cells. Each of the cells 50 in the battery 12 can store electric charge. Thus, each of the cells 50 has a state of charge (SOC). The SOC may be expressed as a percentage of a cell's rated capacity. For example, a cell with a SOC of 0% may have no electric charge while a cell with a SOC of 100% may be full of electric charge. In addition, each of the cells 50 may have a nominal cell voltage between 3.5 and 4 volts. The cells 50 in the battery 12 can be connected in series to provide the total output power of the battery 12. For example, the total output power of the battery 12 may be provided at 300 volts. As the battery 12 provides power, for example, to the electric motor 26 to propel the vehicle 14, the SOC across the cells 50 may become unequal. Some of the cells 50 in the battery 12 may have a greater SOC than other cells 50 in the battery 12. When this occurs, the battery 12 is said to be unbalanced. Therefore, the system 10 may perform an equalization or "balance" on the battery 12 to substantially equalize the battery 12.

With continuing reference to FIGS. 1-2, the battery 12 may include one or more modules 52. Each module 52 includes one or more of the cells 50 for storing energy. Each module 52 may include a single (i.e., only one) storage cell 50 such that the number of modules 52 is equal to the number of cells 50. However, the battery 12 may include any appropriate number of modules 52 and each module 52 may further include any appropriate number of cells 50.

As illustrated in FIGS. 1-2, the system 10 for balancing the battery 12 includes at least one thermoelectric device 60 and a controller. The controller of the system 10 can be any suitable controller to control or cause distribution of electric energy from the thermoelectric device 60 to the battery 12.

For example, the controller of the system 10 may be the BCM 46, the VSC/PCM 40, or a combination thereof. The controller of the system 10 may be described as distributing the electric energy when the controller of the system 10 causes the electric energy to be distributed to one or more cells 50 in the battery 12 or when the controller of the system 10 controls distribution of the electric energy to one or more cells 50 in the battery 12. The controller of the system 10 is hereafter referenced as the "BCM" with reference numeral 46.

In operation, the thermoelectric device 60 receives thermal energy and converts the thermal energy into electric energy. The thermoelectric device 60 of FIG. 1 receives thermal energy from the battery 12, the engine 16, and the transaxle 18. However, the thermoelectric device 60 can receive thermal energy from any suitable heat source or combination of heat sources. Thus, the thermoelectric device 60 may receive thermal energy from only one of the battery 12, the engine 16, and the transaxle 18 or from a combination of different heat sources, such as the engine 16 and the electric motor 26.

The heat source may be a heat source inside the vehicle 14, such as the engine 16, or a heat source outside the vehicle 14, such as a road or driveway. Moreover, the thermoelectric device 60 may receive thermal energy from simultaneously from both inside and outside the vehicle 14. For example, the thermoelectric device 60 may receive thermal energy from a road or driveway that the vehicle 14 is on as well as from the transaxle 18.

The thermoelectric device 60 can receive thermal energy either before, during, after operation of the vehicle 14. In one example, the thermoelectric device 60 may receive thermal energy when the battery 12 is disconnected from the vehicle 14. In another example, the thermoelectric device 60 may receive the thermal energy as the engine 16, the battery 12, or both provide power to the drive wheels 20 to propel the vehicle 14. In yet another example, the thermoelectric device 60 may receive the thermal energy from the thermoelectric device 60 after a drive cycle of the vehicle 14 has been completed. In such an example, the engine 16 may provide sufficient thermal energy to the thermoelectric device 60 even after the vehicle 14 has been switched off.

As shown in FIG. 1, the battery 12 may include a plurality of thermoelectric devices 60'. The thermoelectric devices 60' in the battery 12 may receive thermal energy from one or more of the cells 50 and convert the thermal energy into electric energy, which can be used to charge at least one of the cells 50. In addition, the thermoelectric devices 60' may receive electric energy from one or more of the cells 50 and convert the electric energy into thermal energy, which can be used to heat at least one of the cells 50 in the battery 12. The BCM 46 controls the thermoelectric devices 60' in the battery 12.

As illustrated in FIG. 1, the system 10 may include a thermoelectric controller 62. The thermoelectric controller 62 controls the thermoelectric device 60 either alone or in conjunction with the VSC/PCM 40. In operation, the thermoelectric controller 62 may control an operative mode of the thermoelectric device 60, such as an on or off mode, as well as how the thermoelectric device 60 operates in the system 10. For example, the thermoelectric controller 62 may control how much electric energy the thermoelectric device 60 transmits to another device in the vehicle 14.

As illustrated in FIG. 1, the system 10 may include a DC/DC converter 64. In operation, the DC/DC converter 64 receives the electric energy from the thermoelectric device 60 along electrical communication path 66 and converts the electric energy into a form of electric energy more suitable for the battery 12. For example, the DC/DC converter 64 may receive electric energy at or around 1 volt from the thermoelectric device 60 and step up the electric energy to a different voltage, such as a voltage between 3.5 and 4 volts, which may be more suitable for the battery 12. In such an example, the DC/DC converter 64 may step up the electric energy from 1 volt to 3.8 volts.

Referring to FIG. 2, the DC/DC converter 64 may include a DC-to-AC converter 70, a transformer 72, and an AC-to-DC converter 74 to convert the electric energy from the thermoelectric device 60 into a form of electric energy that is more suitable for the battery 12. In addition, the DC/DC converter 64 may be a bidirectional DC/DC converter. In operation, the bidirectional DC/DC converter can convert electric energy from the battery 12 into a form of electric energy that is more suitable for the thermoelectric device 60 to receive and convert into thermal energy. Thus, the thermoelectric device 60 may be adapted to receive the electric energy from the battery 12 and convert the electric energy to thermal energy to heat at least a portion of the battery 12. For example, the thermoelectric device 60 may heat one or more of the cells 50 in the battery 12. Furthermore, the BCM 46 may distribute electric energy from the battery 12 to the thermoelectric device 60 when at least one of the cells 50 in the battery 12 has a state of charge exceeding a predetermined state of charge, such as 100%.

With continuing reference to FIG. 2, the DC-to-AC converter 70 of the DC/DC converter 64 may be a bi-directional controlled rectifier/inverter, the transformer 72 may be a high-frequency isolation transformer, and the AC-to-DC converter 74 may be a bi-directional controlled rectifier/inverter.

Referring to FIG. 1, the system 10 may include an array of switches 68, 68' or a combination thereof depending on the particular application or configuration of the system 10. The BCM 46 can control the array of switches 68, 68' to distribute the electric energy from the thermoelectric device 60 to each storage cell 50 in the subset. The array of switches 68, 68' may be any suitable type of relay system or set of electromechanical devices to allow the BCM 46 to selectively control electric energy flow to and from each of the cells 50 in the battery 12. The system 10 may include the array of switches 68, 68' as part of the BCM 46 (generally shown with reference numeral 68) or as a separate component from the BCM 46 (generally shown with reference numeral 68') depending the particular application or configuration of the system 10.

The battery 12 can receive the electric energy from the DC/DC converter 64 along either electrical communication path 80 or electrical communication path 80' depending the particular application or configuration of the system 10. Whether the battery 12 receives the electric energy along path 80 or path 80' can depend on the system 10 including the array of switches 68, 68' in a particular configuration or arrangement. If the array of switches 68' is separate from the BCM 46 then the battery 12 receives the electric energy from the DC/DC converter 64 along path 80'. Similarly, if the array of switches 68 is part of the BCM 46 then the battery 12 receives the electric energy from the DC/DC converter 64 along path 80. Path 82 provides the electrical communication link between the BCM 46 and the array of switches 68'. For example, the BCM 46 may control the array of switches 68' via path 82 to provide the amount of electric charge in each of the cells 50 to the BCM 46 via path 82.

In operation, the BCM 46 determines a subset of the cells 50 or modules 52 to be charged. The subset does not include all of the cells 50 in the battery 12. For example, the subset may include only one of the cells 50, such as the storage cell in the battery 12 with the lowest SOC. In another example, the subset may include the cells 50 in one or more modules 52 in the battery 12.

As illustrated in FIG. 1, the BCM 46 may receive one or more signals or electric signals indicating the amount of electric charge in each of the cells 50. The BCM 46 may receive the signals either along path 80 or path 82 depending on the particular configuration of the system 10. The BCM 46 processes the signals 80 to determine the subset based on the amount of electric charge in each of the cells 50. Based on the amount of electric charge in each of the cells 50, the BCM 46 distributes the electric energy from the DC/DC converter 64 to each storage cell 50 in the subset in an effort to balance the battery 12. The BCM 46 may determine the subset based on which of the cells 50 in the battery 12 has an electric charge below a predetermined amount of electric charge. For example, the predetermined amount of electric charge may be represented as a standard operating state of charge (e.g., 50%). Voltage of the cells 50 can be used to indicate the electric charge of the cells 50. Thus, the BCM 46 may determine the subset as only those storage cells in the battery 12 having a voltage below a predetermined voltage, such as 3.5 volts.

As the BCM 46 distributes the electric energy to each storage cell 50 in the subset, the system 10 performs an equalization or "balance" on the battery 12 to substantially equalize the amount of electric charge in the battery 12. For example, the battery 12 may be substantially equalized when the state of charge (SOC) in any two of the cells 50 differs by less than 5%. When this occurs, the amount of electric charge in the cells 50 becomes more substantially equalized.

The BCM 46 may distribute the electric energy from the DC/DC converter 64 to each storage cell 50 in the subset based on the amount of electric charge in each storage cell 50 in the subset. For example, the BCM 46 may distribute the electric energy to the storage cell 50 in the subset having the least amount of electric energy before distributing the electric energy to others cells 50 in the battery 12. Thus, the BCM 46 may distribute electric energy to a storage cell having a low electric charge or a low SOC before a storage cell having a greater electric charge or a greater SOC.

The BCM 46 may determine a desired state of charge for at least one of the cells 50 in the subset. For example, the desired state of charge may be represented as a target state of charge (e.g., 80%). Furthermore, the BCM 46 may distribute the electric energy from the thermoelectric device 60 to the one storage cell 50 until the one storage cell 50 obtains the desired state of charge (e.g., 80%). In such an example, the one storage cell 50 may obtain the desired state of charge (e.g., 80%) before the BCM 46 distributes the electric energy to another storage cell 50 in the battery 12. The BCM 46 may distribute the electric energy to the one storage cell 50 gradually using a non-step function, such as by using a ramp function or a logarithmic function. Alternatively, the BCM 46 may distribute the electric energy to the one storage cell 50 at a relatively constant level using a step function or in a sequence of periodic pulses.

The BCM 46 may determine a state of balance of the battery 12 based on the amount of electric charge in each of the cells 50. The state of balance may indicate a difference of electric charge between at least two of the cells 50 in the battery 12. For example, the state of balance may indicate the difference of electric charge or SOC between the storage cell 50 having the highest electric charge or SOC (e.g., 60%) in the battery 12 and the storage cell 50 having the lowest electric charge or SOC (e.g., 30%) in the battery 12. In this example the difference of SOC is 30%. However, the state of balance may be determined using any suitable algorithm or method to determine whether the battery 12 is substantially equalized. Furthermore, the BCM 46 may distribute the electric energy from the thermoelectric device 60 to the cells 50 based on the state of balance. For example, the BCM 46 may distribute the electric energy from the thermoelectric device 60 to the cells 50 when the state of balance indicates the difference of electric charge is greater a predetermined threshold. Thus, the BCM 46 may distribute the electric energy from the thermoelectric device 60 to the cells 50 in the battery 12 based on the difference of electric charge. In anther example, the BCM 46 may distribute the electric energy from the thermoelectric device 60 to the cells 50 when the state of balance indicates that the cells 50 in the battery 12 are generally unequally charged.

The BCM 46 can distribute the electric energy to each storage cell 50 in the subset either during, after, or both during and after operation of the vehicle 14. In addition, the BCM 46 can determine when the battery 12 is substantially equalized or "balanced". When the battery 12 is balanced, the BCM 46 can distribute the electric energy from the thermoelectric device 60 in a generally uniform manner to each of the cells 50 in the battery 12 to charge the battery 12 from a first SOC to a second SOC greater than the first SOC.

Figure 3:
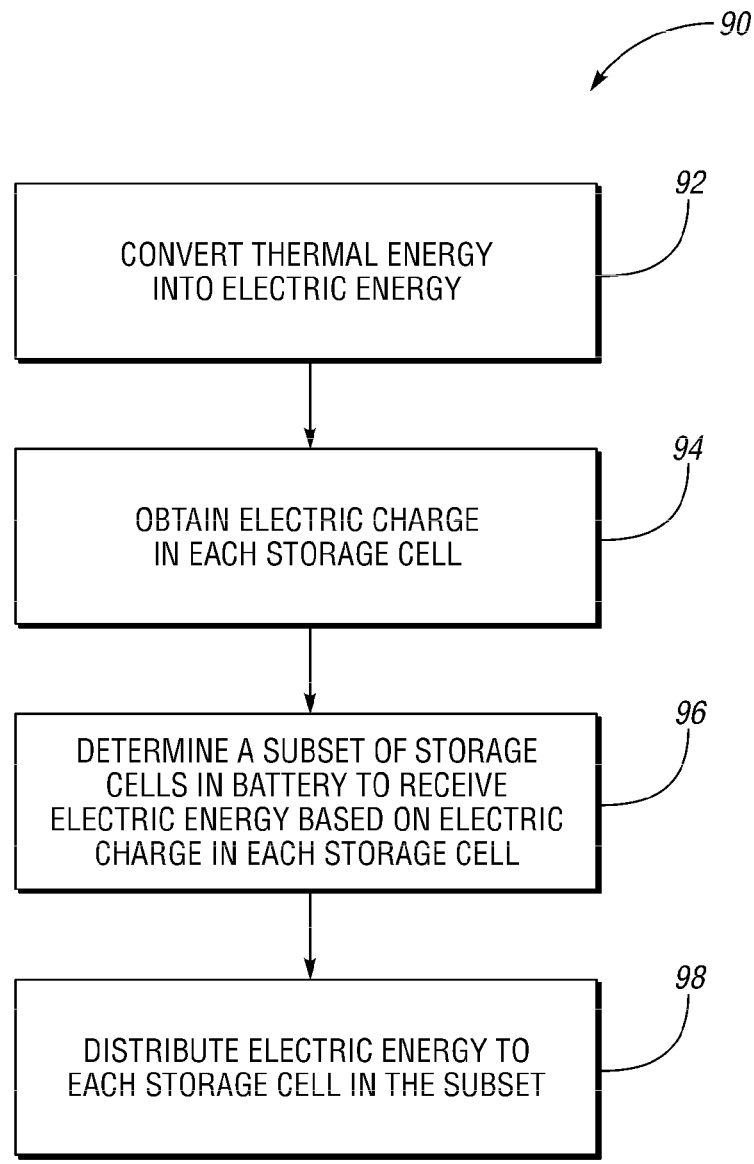
FIG. 3 is a flowchart diagram illustrating a method of balancing the storage battery.

With reference to FIG. 3, a flowchart diagram 90 illustrating steps of a method of balancing a storage battery for an automotive vehicle is generally provided. The storage battery is of the type including a plurality of storage cells. In addition to the steps shown in FIG. 3, a programmable logic device, such as the BCM 46, may be programmed with additional steps to provide additional functionality.

Referring again to FIG. 3, the automotive vehicle and its components illustrated in FIG. 1 are referenced throughout the discussion of the method to facilitate understanding of various aspects of the present invention. The method of balancing the battery 12 in the vehicle 14 may be implemented through a computer algorithm, machine executable code, or a software program programmed into a suitable programmable logic device(s) of the vehicle 14, such as the VSC/PCM 40, the BCM 46, other controller in the vehicle 14, or a combination thereof. Although the various steps shown in the flowchart diagram 90 appear to occur in a chronological sequence, at least some of the steps may occur in a different order, and some steps may be performed concurrently or not at all.

At step 92 of flowchart diagram 90, thermal energy is converted into electric energy. For example, the battery 12, the engine 16, the transaxle 18, other suitable heat source, or combination thereof can provide the thermal energy. Furthermore, the thermoelectric device 60 may convert the thermal energy into electric energy.

At step 94, an amount of electric charge in each of the cells 50 in the battery 12 is obtained. The BCM 46, the VSC/PCM 40, or both can determine the amount of electric charge in each of the cells 50.

At step 96, a subset of the cells 50 is determined. The subset indicates the cells 50 in the battery 12 to receive the electric energy. The subset does not include all of the cells 50 in the battery 12. The BCM 46, the VSC/PCM 40, or both can determine the subset based on the amount of electric charge in each of the cells 50.

At step 98 of FIG. 3, electric energy is distributed to each storage cell 50 in the subset in an effort to balance the battery 12 in the vehicle 14. For example, the BCM 46 and/or the array of switches 68, 68' may be used to distribute the electric energy to each storage cell 50 in the subset determined in step 96.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A battery balancing system comprising:
   a thermoelectric device disposed within a battery including cells to receive thermal energy therefrom and convert the thermal energy into electric energy; and
   a controller configured to
      receive input indicative of electric charge in each of the cells, and
      charge a subset of the cells with least electrical charge based on an electric charge difference between a cell having highest electric charge and a cell having lowest electric charge.

2. The battery balancing system of claim 1 wherein the electric energy that is distributed to each cell in the subset substantially equalizes electric charge in the cells.

3. The battery balancing system of claim 1 wherein the controller causes the electric energy to be distributed to each cell in the subset based on the electric charge in each cell in the subset.

4. The battery balancing system of claim 3 wherein the controller causes the electric energy to be distributed to a cell having a low electric charge before the controller causes the electric energy to be distributed to a cell having a greater electric charge.

5. The battery balancing system of claim 1 wherein the controller is configured to determine the subset based on which of the cells has an electric charge below a predetermined amount of electric charge.

6. The battery balancing system of claim 1 wherein the controller is configured to determine a desired state of charge for at least one of the cells and to cause the electric energy to be distributed from the thermoelectric device to the one cell until the one cell obtains the desired state of charge.

7. The battery balancing system of claim 6 wherein the one cell obtains the desired state of charge before the controller causes the electric energy to be distributed to another cell in the battery.

8. The battery balancing system of claim 1 wherein the controller is configured to determine a state of balance of the battery based on the electric charge difference between the cell having highest electric charge and the cell having lowest electric charge.

9. The battery balancing system of claim 8 wherein the controller causes the electric energy to be distributed when the state of balance indicates that the cells in the battery are unequally charged.

10. The battery balancing system of claim 1 wherein the controller is configured to determine a difference of electric charge between at least two of the cells in the battery and to cause the electric energy to be distributed from the thermoelectric device to the cells in the battery based on the difference of electric charge.

11. The battery balancing system of claim 1 wherein the controller is configured to cause the electric energy to be distributed to each cell in the subset after a vehicle drive cycle.

12. The battery balancing system of claim 1 further comprising an array of switches, the controller being configured to control the array of switches to cause the electric energy to be distributed from the thermoelectric device to each cell in the subset.

13. The battery balancing system of claim 1 further comprising a second thermoelectric device, wherein the second thermoelectric device is adapted to receive thermal energy from at least one of an external surface, an engine, and a transaxle.

14. The battery balancing system of claim 1 wherein the thermoelectric device further comprises at least two thermoelectric devices, each device being adapted to receive electric energy from the battery and to convert the electric energy to thermal energy to heat at least one of the cells.

15. The battery balancing system of claim 14 wherein the controller is configured to cause the electric energy to be distributed from the battery to the thermoelectric device when at least one of the cells in the battery has an amount of electric charge exceeding a predetermined amount of electric charge.

16. The battery balancing system of claim 1 wherein the controller is configured to cause the electric energy to be distributed in a generally uniform manner to each of the cells in the battery when the battery is substantially equalized.

17. A system for balancing an electrical storage battery with a plurality of storage cells, the system comprising:
   a thermoelectric device disposed within the electrical storage battery and adapted to receive thermal energy and to convert the thermal energy into electric energy, and to receive electric energy and to convert the electric energy into thermal energy; and
   a controller configured to determine a subset of the storage cells with the least electrical charge in the storage battery to be charged based on an amount of electric charge in each of the storage cells and to cause the electric energy to be distributed to storage cells in the subset with the least electrical charge with an effort to balance the storage battery; and
   wherein the controller is further configured to determine a state of balance of the storage battery based on an electric charge difference between a storage cell having a highest electric charge and a storage cell having a lowest electric charge and to control distribution of the electric energy from the thermoelectric device to the storage cells based on the state of balance.

18. The system of claim 17 wherein the controller is further configured to heat at least one of the cells by controlling distribution of electric energy to the thermoelectric device.

* * * * *